United States Patent [19]

Henriksson et al.

[11] Patent Number: 5,661,945
[45] Date of Patent: Sep. 2, 1997

[54] UNIVERSAL BEAM FOR MOVABLE LOAD

[75] Inventors: Anders Henriksson, Södertälje; Lennart Stenström; Valter Stenström, both of Trosa, all of Sweden

[73] Assignee: Transman AB, Trosa, Sweden

[21] Appl. No.: 586,695

[22] PCT Filed: Aug. 17, 1994

[86] PCT No.: PCT/SE94/00749

§ 371 Date: Jan. 25, 1996

§ 102(e) Date: Jan. 25, 1996

[87] PCT Pub. No.: WO95/06222

PCT Pub. Date: Mar. 2, 1995

[30] Foreign Application Priority Data

Aug. 20, 1993 [SE] Sweden ................... 9302690

[51] Int. Cl.$^6$ ..................................... E04C 3/30
[52] U.S. Cl. ............ 52/726.2; 52/731.7; 52/730.4; 52/239; 52/731.2
[58] Field of Search ............... 52/726.2, 730.4, 52/730.6, 731.2, 731.7, 732.1, 737.6, 239

[56] References Cited

U.S. PATENT DOCUMENTS

| | | | |
|---|---|---|---|
| 2,082,792 | 6/1937 | Dean | 52/737.6 |
| 3,544,181 | 12/1970 | Schottland | 52/731.2 X |
| 4,342,144 | 8/1982 | Doguchi | 52/730.4 X |
| 5,200,240 | 4/1993 | Baker | 52/690 X |
| 5,211,502 | 5/1993 | Upham-Hill | 52/239 X |
| 5,339,571 | 8/1994 | Fassler | 52/239 X |
| 5,394,658 | 3/1995 | Scheeiner et al. | 52/239 X |

FOREIGN PATENT DOCUMENTS

| | | |
|---|---|---|
| 203352 | 12/1986 | European Pat. Off. . |
| 291622 | of 1988 | European Pat. Off. . |
| 2244022 | 3/1973 | Germany ............ 52/731.2 |
| 1940733 | 7/1973 | Germany ............ 52/730.4 |
| 3245308 | 6/1983 | Germany . |
| 3336496 | 8/1989 | Germany . |
| 3838220 | 4/1992 | Germany . |

*Primary Examiner*—Carl D. Friedman
*Assistant Examiner*—Winnie Yip
*Attorney, Agent, or Firm*—Nixon & Vanderhye P.C.

[57] ABSTRACT

A universal beam for supporting a movable load is capable of handling heavier loads than prior systems and can be constructed of aluminum extrusions or other materials allowing high accuracy, and has good torsional stiffness and other desired properties. A symmetrical U-shaped profile extrusion has parallel shanks extending downwardly from a top and a connecting member between the shanks. Between the connecting member and the bottom of the extrusion a load supporting, guiding and driving volume is provided. The shanks between the connecting member and the top, except at the corners, have a thickness that is at most 4% of the extrusion width. The connecting member includes a central wall, first and second drums adjacent locally reinforced portions of the shanks, a generally flat bottom portion, and inner walls substantially parallel to the shanks and having a substantially flat inner surface.

20 Claims, 7 Drawing Sheets

FIG. 11

UNIVERSAL BEAM FOR MOVABLE LOAD

CROSS REFERENCE TO RELATED APPLICATION

This application is the U.S. National Phase of International Application No. PCT/SE94/00749 filed Aug. 27, 1994.

BACKGROUND AND SUMMARY OF THE INVENTION

The present invention relates to a universal beam for supporting a movable load, the manufacture of which includes extrusion, said beam having a substantially symmetrical U-shaped profile, between the shanks of which is a connecting member and below that a space for means to support, guide and drive the load, the height and width of the beam being approximately equal and its corners being provided with thicker portions for attachment.

The object of the invention is to provide a beam of extrudable material which can be used for many advanced applications, the multiplicity of applications being enabled by designing a beam that, thanks to its low weight, is easily manageable and inexpensive even in considerable lengths and long tracks, which is easy to assemble and gives a rigid, strong attachment that, despite its low weight enables precision handling of loads with maximum weight and acceleration in the most varying kinds of loading, that suits widely differing drive systems, that permits the load to be moved and controlled quietly and that also fulfils strict hygienic demands. The beam is primarily designed for robots and other load handlers with payloads that are moved in different dimensions, at least one of which is a linear dimension.

As far as is known no beam exists that comes close to fulfilling all these requirements. The beams coming closest are all made from extruded aluminium alloys. However, they have all been developed for specific applications and it is therefore natural that they do not have the properties described above qualifying them to be termed universal beams. The beam shown in German patent specification 3 336 496, for instance, permits quiet and rapid load transfer but is not a universal beam. In relation to its weight, it exhibits poor rigidity when loaded transversely to its longitudinal axis and its torsional stiffness is extremely poor which means, for instance, that two parallel beams must be used where a single universal beam according to the present invention would suffice. It is also heavy and cumbersome to handle and assemble. It requires expensive external arrangements for its attachment, and rigid intermediate supports arranged at short intervals if appreciable rigidity and bearing capacity are to be achieved.

Said limitations also apply to an even greater extent to the beam shown in Swedish patent specification 449,200. This beam is totally incapable of handling loads during acceleration that produces torsional moment about the longitudinal axis of the beam for the simple reason that trucks that can be built into the beam are quite incapable of transmitting such torsional moment.

There are also several beams and linear systems that include an extruded aluminium profile whose width and height differ greatly. Such a profile cannot fall under the concept universal beam since it only has satisfactory flexural rigidity in one direction and its torsional stiffness is poor in relation to its weight. Furthermore, without external arrangements, it is not suitable for applications requiring good hygiene, nor where quiet running is a requirement.

Finally, there are examples of beam profiles with satisfactory flexural rigidity in all directions and satisfactory torsional stiffness, but they are not arranged to permit the use of quietly moving trucks. The user must insert special linear elements with tracks for balls or rollers. Such elements cause disturbing noise and are sensitive to tough environments. They are also expensive. The user of such beam profiles must also rely on belt transmission, thereby limiting application to relatively short tracks. Thus such beam profiles also fail to qualify for the term of universal beam.

The universal beam for movable loads according to the invention is manufactured primarily by means of extrusion. It has a substantially symmetrical, U-shaped profile, between the shanks of which is a connecting member and an open space for means to support, guide and drive the load. When the U-shaped profile is oriented with vertical axis of symmetry and its open portion facing downwards, the space for said means is arranged below the connecting member. The height of the profile is equal to or slightly greater than its width. Its corners are provided with thickened portions for attachment.

The universal beam is characterized in that the connecting member is arranged between locally reinforced portions of the shanks of the profile and that the U-shaped profile above the reinforced portions, except in the corners, has a thickness that is at most 5% of the width of the beam. The connecting member consists of two drums joined by a central, substantially horizontal transverse wall. The outer wall of the drums consists of said locally reinforced portions, their bottom wall being shaped with a widened, for the most part horizontal and flat lower side, while their inner wall is formed with a rigid attachment to the central transverse wall and under there with a substantially vertical, flat surface.

In a preferred embodiment the extension of the substantially vertical, flat surfaces is less than the extension of the lower side of the lower walls of the drums.

In a preferred embodiment the thickness of the U-shaped profile above the reinforced portions, except in the corners, is at most 4% of the width of the beam.

In a preferred embodiment the length of the transverse wall is greater than the extension of the vertical, flat part of the inner wall of the drums.

In a preferred embodiment the transverse wall connects directly to the upper wall of each drum.

In a preferred embodiment the drums and transverse wall are located at such a height that the section factor of torsional stiffness of the universal beam is at least 30% of the smallest of the two moments of inertia of the beam profile about its main axes of inertia.

In a preferred embodiment the lower, free parts of the shanks are given greater flexural rigidity than the part of the U-shaped profile located above the reinforced portions, with the exception of the corners. In such an embodiment the free parts of the beam shanks are provided with a closed recess that is oblong in the vertical direction.

In a preferred embodiment the lower, thickened corner portions of the beam are also widened so that they extend horizontally inwards towards the plane of mirror symmetry of the beam profile.

In an embodiment particularly suitable for large beams, the closed space of the beam between the upper part of the U-shaped profile and its connecting member is stayed like a truss construction by one or more thin, straight walls. In a preferred such embodiment a thin wall inside the profile, which connects to a thickened portion in the upper corner of the profile or to a locally reinforced portion of a shank, has greater thickness in the vicinity of said connecting points than elsewhere. In an embodiment with walls forming trusses, these are so arranged that a centrally situated space above the connecting member has a width that is at least one third of the width of the beam, thereby providing a return path inside the beam and above the connecting member, for a transmission belt of sufficient width and strength to handle such a large load that the beam can otherwise support.

In a preferred embodiment six substantially flat guiding and supporting surfaces are provided for the movable load, two of which are arranged on the sides of the drums facing each other, two on the lower sides of the drums and two on the upper side of the lower, inwardly widened, thickened corner portions of the beam.

In a preferred embodiment the inwardly facing part of the lower, widened corner portions of the beam is formed with recesses to retain exchangeable strips designed for guiding and sealing against a transmission belt adapted for the system in question for driving the movable load. In a similarly preferred embodiment a long, narrow space is provided between the drums and immediately below the central transverse wall, designed for a friction plate, a rack or other aid for driving the movable load, and by arrangements to guide and secure these aids.

In another preferred embodiment, where attachment of the beam itself is enabled by T-grooves having supporting bosses, such grooves are arranged in said locally reinforced portions, the upper and lower supporting bosses of said grooves being in direct and close connection to the upper or lower wall respectively, of the adjacent drum. In another embodiment of the beam, the manufacture of which includes extrusion, attachment grooves are shaped with a pronounced bevel at the opening towards the outer side of the beam, and in its inner part with a lateral space of a size adapted to receive threaded square washers, other nuts and flat pieces of steel with threaded openings and the like for insertion obliquely from the side into the groove, without requiring access to the ends of the beam.

The invention also relates to a tool for extruding beams or beam halves, etc. in accordance with the above. Characteristic of the tool is that the part of the tool where the extruded beam leaves the tool has an extrusion gap shaped substantially in accordance with the beam profile described above. Particularly large profiles and long beams are produced by welding together two identical, extruded beam halves using longitudinally running welds, one of which is located centrally in the upper part of the U-shaped profile and the other centrally in the transverse wall of the connecting member.

The need fulfilled by the present invention has long been known without being satisfied. The need is to provide a universal beam that can be used independently and as a component in a building box system for a plurality of advanced applications. Some examples are:

Linear and surface portal robots with high precision, large span and considerable loading with weight or acceleration of considerable mass.

Pillar robots with high precision, great difference in height, large load and great acceleration both vertically and horizontally.

Shuttles, conveyors for great load and acceleration.

Vertical robots, e.g. in installations for high-speed painting of large surfaces.

Programmable automatic overhead cranes with large span and load.

Servo-controlled washing installations, e.g. for aircraft.

Insofar as these and similar machines have been possible to build, this has been done mainly with steel constructions. These have been heavy and difficult to handle, as well as being extremely expensive due to their being individually designed and also requiring a considerable amount of welding. Lack of precision in the tracks of the beams has had to be compensated by welding on material which must then be ground or finished in some other way. Poor torsional stiffness in the beams has resulted in poor function or necessitated subsequent reinforcement with extra torsionally rigid drums or trusses. Aluminium profiles with good accuracy and with strength and rigidity suitable for some loads are also in use, as mentioned above. In spite of the relatively large amount of material required, such profiles are too weak to be suitable for most of the applications listed above for the universal beam according to the invention.

Existing profiles cannot handle heavy loads.

Profiles have sometimes had to be rejected due to poor possibility of attachment.

Most of the profiles currently available are excluded from many applications due to their extremely poor torsional stiffness. It is impossible even to hang a cable rack along the side of a beam without the beam becoming extremely twisted.

Torsionally rigid profiles that are supplemented by linear units to support and guide the load which must transmit considerable moment, have had to be combined from several parts where each part has its own specific function. They have therefore become expensive and sensitive to dirt, as well as being noisy when in operation.

The invention provides a beam that fulfils all the technical requirements in the example applications above, that permits the use of many alternatives for driving carriages or trolleys as well as perfectly acceptable guidance of these even under the influence of considerable forces transverse to the beam and great moment in optional direction. Compared with a somewhat heavier steel beam of the type now used, the beam according to the invention carries several times as much load and also has 100 times greater torsional stiffness. Compared with somewhat heavier aluminium profiles according to current technology, the beam according to the invention has more than equal carrying capacity and permits the handling of loads causing several times greater torsional moment. The beam fulfils high demands for hygiene and has an attractive and functional appearance irrespective of how it is oriented in a room or from which direction it is beheld. It allows quiet movement of the load.

BRIEF DESCRIPTION OF THE DRAWINGS

The invention will be described in more detail in the following with reference to the drawings.

DETAILED DESCRIPTION OF THE DRAWINGS

The universal beam according to the invention is in the form of a profile suitable for extrusion. Light metal alloys suitable for extrusion can generally be used as material for the beam. These provide good bearing strength and rigidity. However, the invention is not limited to the use of light metals. It is also intended for use with other extrudable materials, both already existing materials and materials which may be developed in the future. Extreme environments may demand the use of materials resistant to chemicals, for instance, such as certain plastics, with or without the addition of fibres to provide reinforcement.

Figure 1:
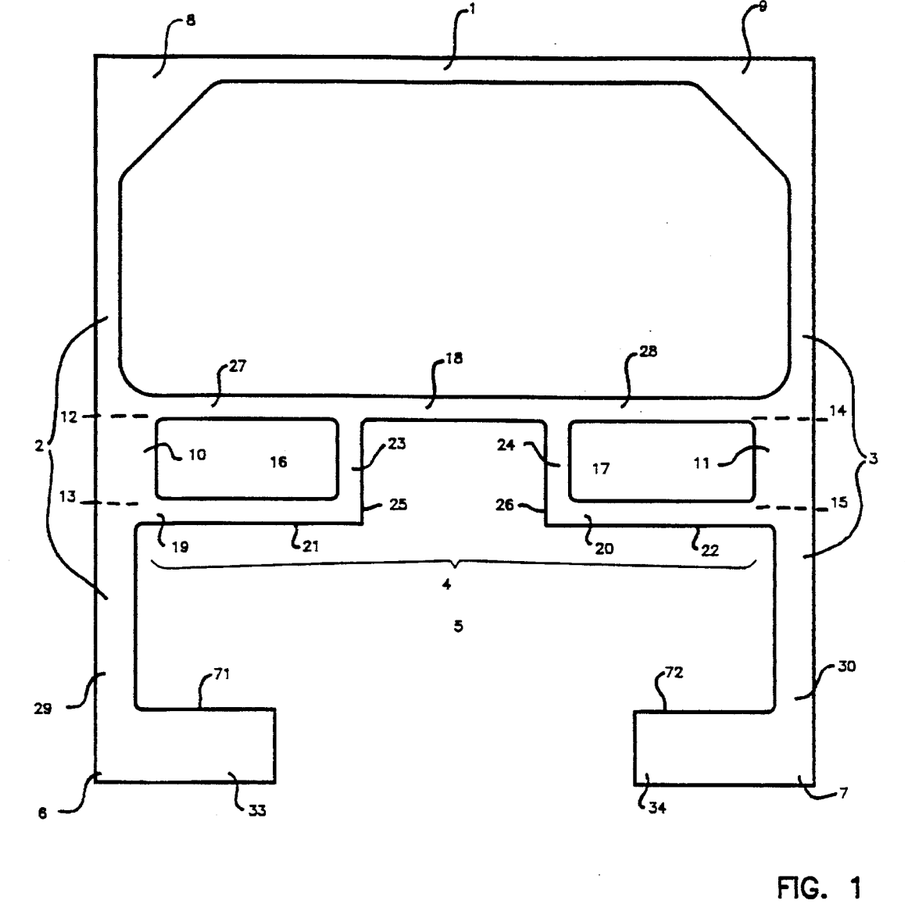
FIGS. 1 and 2 show simple profiles for a universal beam according to the invention.
Figure 2:
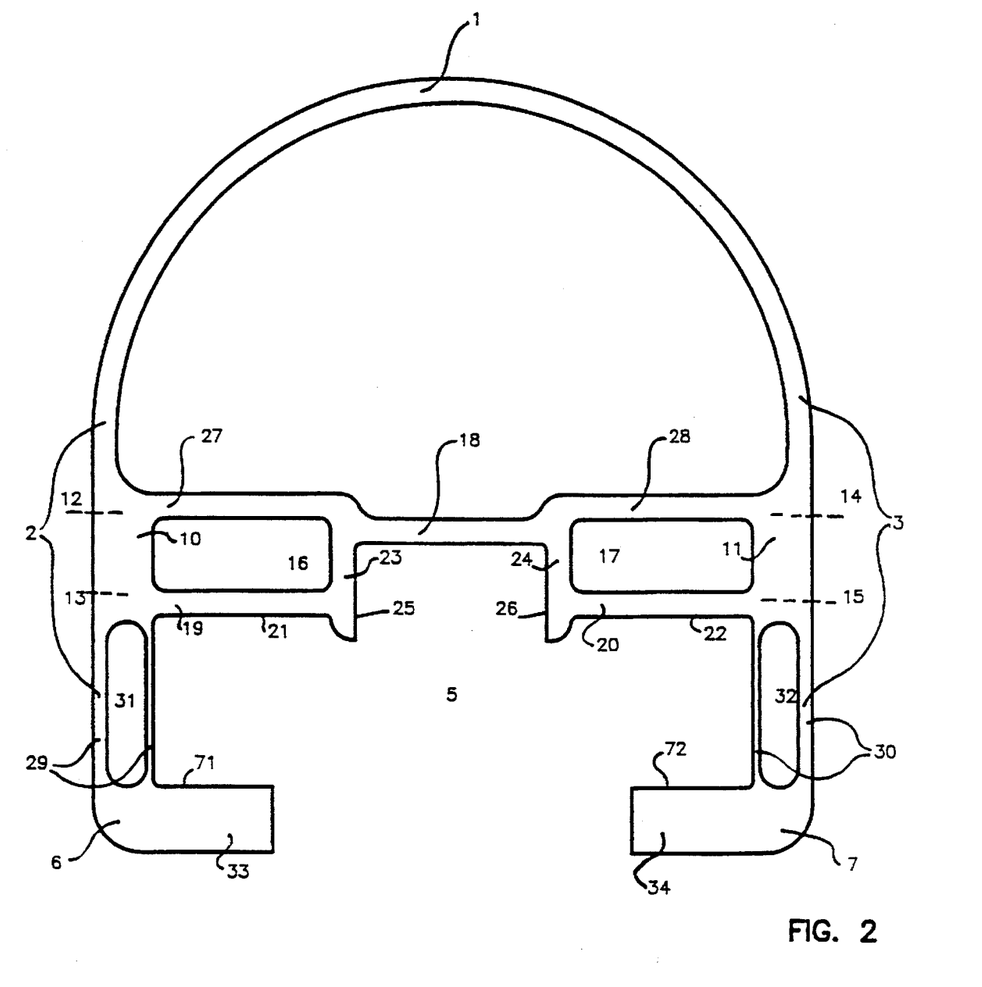

FIGS. 1 and 2 show simple profiles according to the invention. Like many profiles used nowadays, the new profile comprises a U-shaped structure (an inverted U in the drawings), the mid-portion of which is designated 1 and the shanks 2 and 3. Between the shanks of the profile is a connecting member 4 and below that, a space 5 for arrangements for supporting, guiding and driving the movable load. As with other U-shaped profiles that must be both strong and resistant to bending in more than one direction, the height of the new profile is equal to or somewhat greater than its width. The reasons for this is that good and uniform flexural stiffness is desirable in all directions. A height that somewhat exceeds the width may be favorable in an embodiment according to FIG. 2, where the mid-portion of the U-section is rounded, or if exactly the same rigidity is desired about both axes X and Y, marked in FIG. 3. Otherwise the rigidity about the axis Y of symmetry is somewhat greater due to the design of the profile in other respects. However, it may be difficult to justify the height of the profile being more than 10% greater than its width. However, considering transportation and assembly of the beam in various positions, and the user's memorisation, a universal beam with equal height and width is deemed most practical. Examples of beams with this simple proportion are therefore illustrated in FIGS. 1 and 3, as well as FIGS. 5 and 7, but the invention is not limited to this proportion. Similar to other beam profiles, the universal beam has thickened portions in the corners 6, 7, 8, 9 (usually four, in FIG. 2 two), intended for attachment of the beam itself or for attachment of other equipment to the beam.

The universal beam differs from other beams in that the connecting member 4 is arranged between locally reinforced portions 10, 11 of the shanks 2, 3 of the section. The connecting member 4 has several functions.

Firstly it is a condition for the beam acquiring the great torsional stiffness that can be required of a universal beam. Secondly it enables a stable attachment of the beam, which is necessary if the great torsional stiffness of the beam is to be fully exploited, i.e. that the beam cannot be twisted loose from its attachment. The locally reinforced sections 10, 11 are also necessary in order, together with the connecting member, to provide requisite stability. The reinforced portions have such vertical extension that attachment is possible at two levels close to each other, i.e. at levels 12, 13, 14 and 15, the odd numbers indicating the lower level and the even numbers indicating the upper level. The portions are also so located as to transmit clamping forces from the attachment points as directly as possible to the connecting member 4.

Also specific to the universal beam is that the connecting member 4 consists of two drums 16, 17 joined by a central, substantially horizontal transverse wall 18. The outer wall of the drums 16, 17 is formed by said locally reinforced portions 10, 11 of the shanks 2, 3 of the profile. The bottom wall 19, 20 of the drums 16, 17 is shaped with an extended, for the most part horizontal and flat lower side 21, 22. The inner wall 23, 24 of the drums 16, 17 is formed with a rigid attachment to the central transverse wall 18 and under there with a substantially vertical, flat surface 25, 26. The vertical extension of this surface is preferably less than the lower side of the lower wall 19, 20 of the drums 16, 17. This enables optimal disposition of the space 5 below the drums 16, 17 and transverse wall 18 for the positioning and in certain cases attachment of arrangements for supporting, guiding and driving the load.

The arrangement described offers not only the advantage of the desired stability and torsional stiffness in the beam, but also a unique opportunity to fully exploit and take advantage of these properties. This is achieved by shaping the space 5 for guiding the load so that it is able to accommodate a carriage or other guiding means that can transmit equally great moment as the beam, and also by means of a principle of the beam attachment that, without complicated and expensive additions, can also transmit moment adjusted to the flexural and torsional stiffness of the beam.

Since the universal beam will be handled in many different ways, it is important for it to be light. It has therefore been shaped to obtain its rigidity and strength through its structure, rather than through considerable wall thickness throughout. Suitable wall thickness for the U-shaped profile above the reinforced portions 10, 11, exclusive the corners 8, 9, is at most 5% of the width of the beam. Particularly in the case of large profiles, e.g. with a width of 30 cm and more, 4% of the width of the beam is an upper limit for the wall thickness.

The walls of the drums 16, 17, at least the outer walls 10, 11, inner walls 23, 24 and lower walls 19, 20, and the corners of the drums, are relatively thick since they must withstand considerable flexural stress. Alternatively each drum 16, 17 may be reinforced by means of a thin diagonal wall inside the drum. This wall has substantially the same effect whether it is inclined inwardly or outwardly.

The diagonal wall gives the drum 16, 17 such stability that the walls and corners of the drum can all be slimmed, thereby reducing the total weight and cost of the beam profile. Since available extrusion technology does not yet permit the manufacture of such diagonal walls, they have not been included in the drawings.

The length of the central transverse wall 18 is significant. To enable the universal beam to guide the movable load with sufficient rigidity in all directions and drive the load with good acceleration, with "tractor drive", the transverse wall 18 must be sufficiently long, longer than the flat portion 25, 26 of the inner wall 23, 24 of the drums. The central transverse wall 18 is placed as high as possible between the drums, to ensure sufficient space 5 below the wall 18 and between the walls 23, 24 for guiding and driving of the movable load. It has been found suitable for the transverse wall 18 to directly connect to the upper wall 27, 28 of each drum. The details of this connection may vary. The simplest method is to allow the upper wall of the drums to constitute a direct extension of the transverse wall, see FIGS. 1, 3 and 5. In another embodiment, shown in, FIG. 7, the transverse wall directly connects to somewhat inclined upper drum walls. In a third embodiment, shown in FIG. 2, the central transverse wall 18 directly connects to the upper drum walls 27, 28, which are slightly curved.

Figure 5:
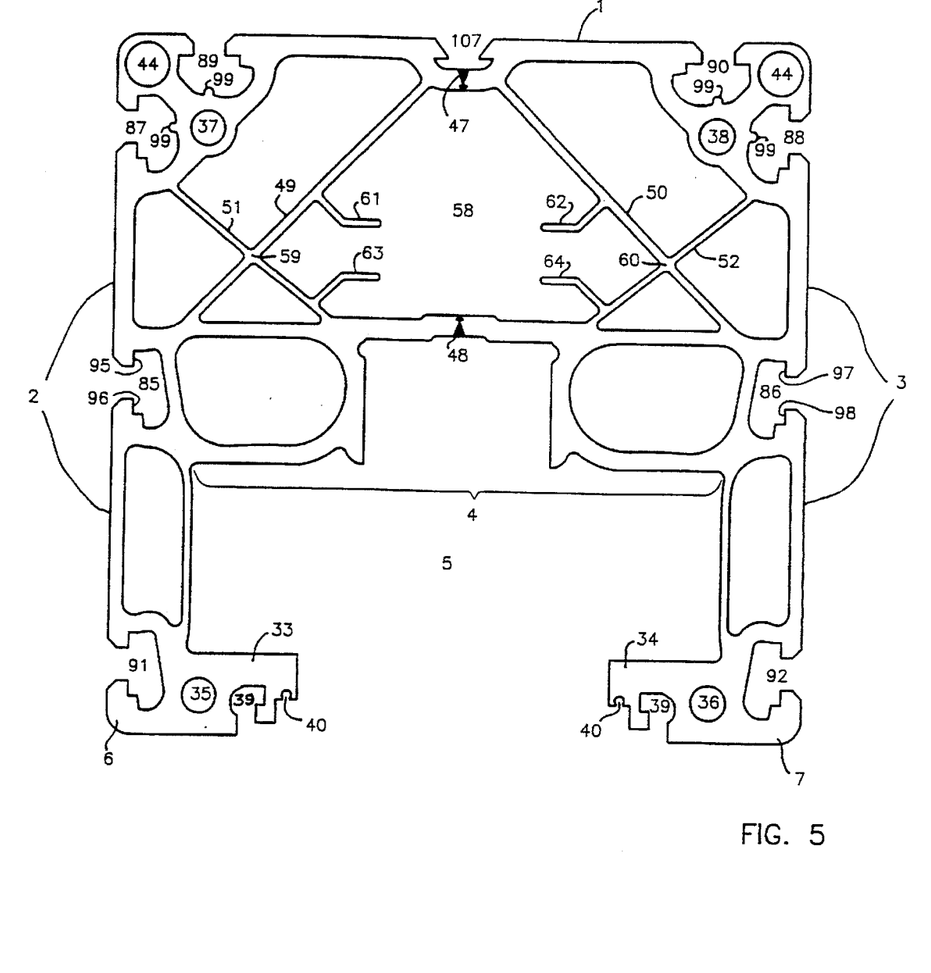
FIG. 5 shows a practically developed, large universal beam according to the invention.
Figure 7:
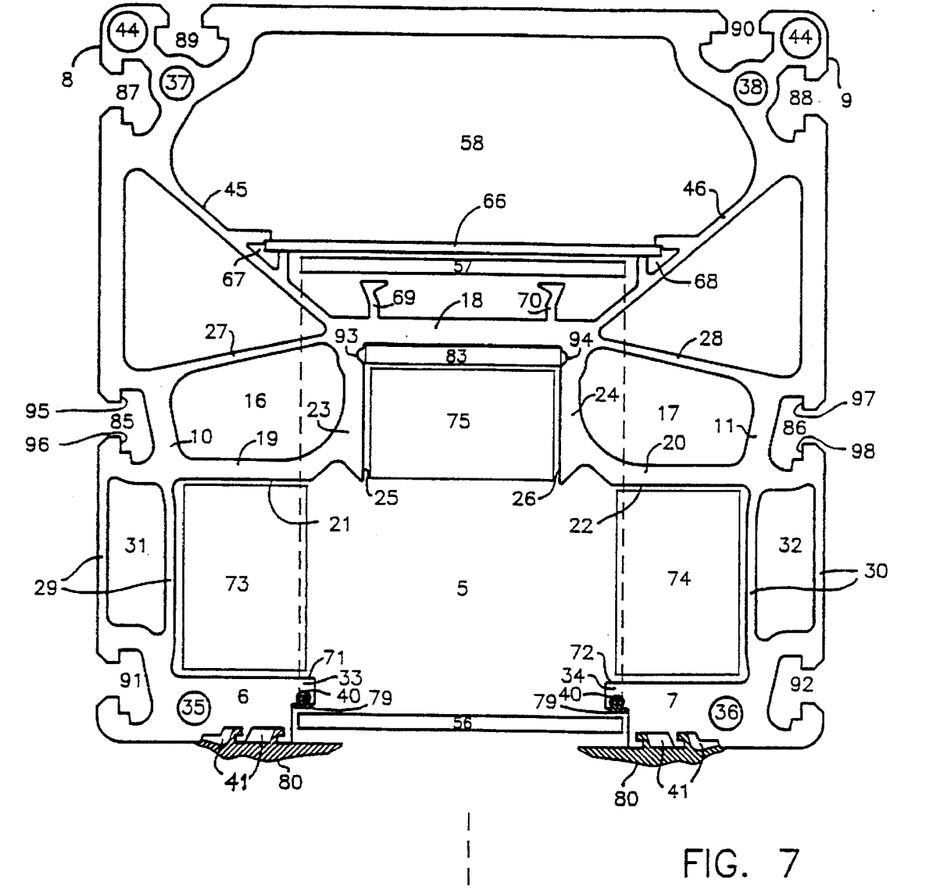
FIG. 7 shows a practically developed, smaller universal beam according to the invention.

The embodiment selected depends on how far down the reinforced portions 10, 11 are located. This in turn depends on the alternative selected to ensure that the beam attachment is strong. The beam in FIGS. 2 is attached on both sides, viz. in the reinforced portions 10, 11. In FIGS. 1, 3, 5 and 7 the beam is sufficiently clamped by securing it on only one side, e.g. the left side, in a thickened portion at the corner 8 and in the reinforced portion 10. The stability of the attachment is determined by the structure of the connecting member of the beam and by the distance between the corner 8 and attachments 12, 13 in portion 10. In FIG. 5 said structure is particularly stable although said distance is moderate. In FIG. 7 the distance is greater, whereas the structure is slightly weaker. In both cases perfectly adequate attachment is obtained. Advantage can be taken of the strength and rigidity of the universal beam and its attachment in several ways: larger load, greater precision, faster servo and shorter beam length for attachment.

Launching a universal beam entails walking a tightrope between various demands in comparison with the competition's and the market's beams developed for specific applications. Every dimension in the beam profile becomes important. Particularly important is that the connecting member 4 of the U-profile is located at the correct level. In order to explain this and to determine the correct level for a certain universal beam, the diagram in FIG. 4 can be used. The abscissa, marked h/H is a measurement of the position h of the connecting member in relation to the beam height H. The magnitudes h and H are marked in FIG. 3. The beam is imagined loaded via a suitable carriage with a large load subjecting the beam to both a bending moment and a torsional moment. The beam can be imagined horizontal, for instance, and the load secured to the end of a similarly horizontal transverse beam secured in the trolley at its other end. The transverse beam with its load is accelerated in the longitudinal direction of the universal beam. In the beam bending moment occurs about the axis X in FIG. 3, deriving from the weight of the load. Bending moment also occurs about the axis Y in FIG. 3, deriving from the acceleration of the load along the universal beam. The loaded beam causes torsional moment about the longitudinal axis Z of the universal beam. The carriage also acquires torsional moment about both the Y and the Z axes. The ability of the universal beam and the carriage to withstand said forces and moment has been termed LOAD CAPACITY in FIG. 4.

Figure 4:
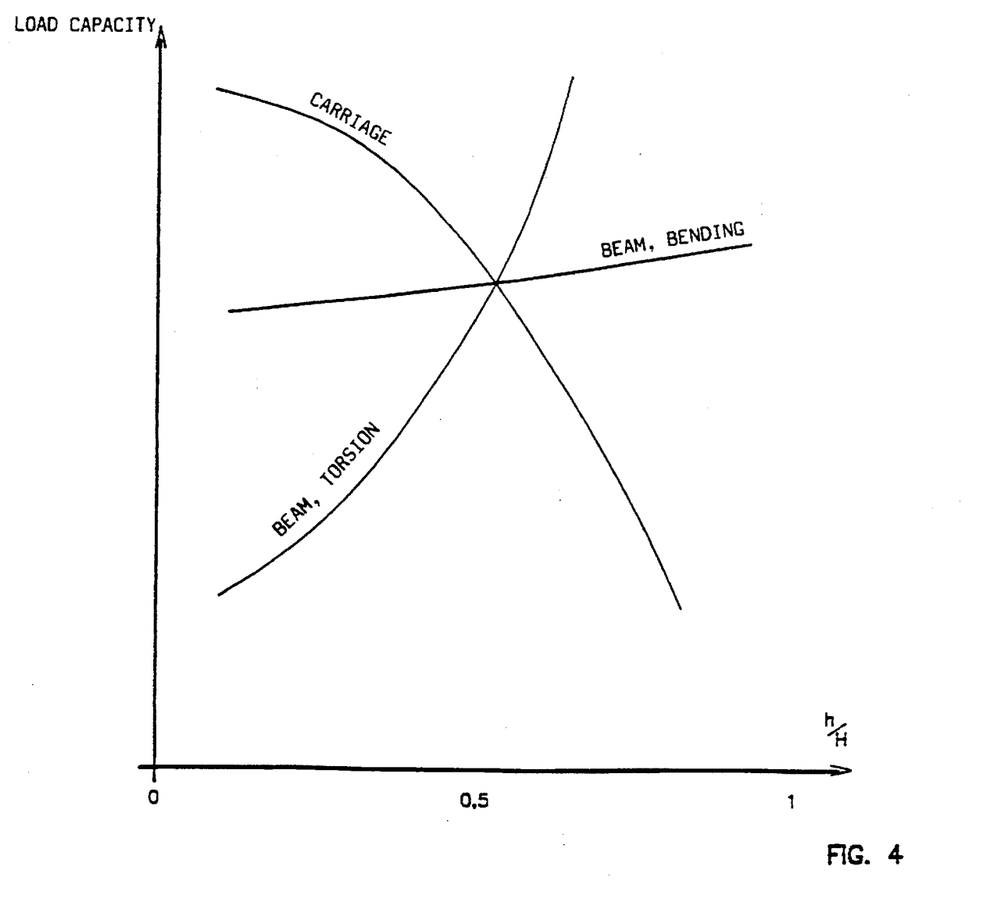
FIG. 4 shows in principle three parameters that elucidate the concept of universal beam.

For bending the moment of inertia about the axis X increases slowly with increasing h/H. Its section modulus in torsion (determined by the section factor of torsional stiffness of the beam) increases strongly with increasing h/H. The load capacity of an optimally designed carriage falls drastically with increasing h/H, due to decreasing space for the carriage. The curves illustrate that there is an optimum, namely where the curve for the beam under torsion intersects the curve for the carriage. The curve marked BEAM, BENDING is higher for a short beam and lower for a long beam. Bending of the beam hardly affects optimization of h/H. On the other hand, the diagram enables the length of beam that can be utilized without intermediate support. The optimum of the quotient h/H shown in the Figure is only applicable to a certain universal beam. This is because the connecting member 4 within certain limits may have different shape and h is therefore difficult to define exactly. To formulate how the connecting member 4 shall be placed vertically it is easier to work with another quotient that takes into consideration different embodiments of the shapes of the connecting member 4. The quotient is chosen between the section factor of torsional stiffness of the profile and its smallest moment of inertia, normally applicable to bending about axis X. Experience indicates that this quotient shall be at least 0.3 in order to give a good universal beam.

The free parts 29, 30 of the shanks are sometimes subjected to a certain bending moment. To ensure that they can withstand this and not be bent to much, the free parts of the shanks, i.e. below the reinforced portions 10, 11 are suitably given a flexural stiffness exceeding the flexural stiffness of the wall of the U-profile above the connecting member 4, with the exception of the thickened portions in the corners. One way of achieving this is to make the parts 29 and 30 thicker than said wall. Another way, which also saves weight, is to give the free parts of the shanks a vertically oblong, closed recess 31, 32. The stability of the shanks can then be further increased by arranging thin diagonal walls in the recesses. Since available extrusion technology does not yet permit the manufacture of such diagonal walls, they have not been shown in the drawings.

Since the connecting member 4 is located rather centrally, and the beam is open at the lower part, the moment of inertia of the beam about X tends to be less than about Y. To compensate this, the lowermost thickened corner portions 6, 7 are widened as shown at 33, 34 to stretch horizontally inwards towards the plane of mirror symmetry of the profile. This also provides space for guide openings 35, 36 for splicing the beam and for various recesses 39–41 for the insertion of strips of various types and for various purpose to be discussed later. In addition to the guide openings 35, 36, two more guide openings 37, 38 are arranged inside the upper corners of the profile. When beams are to be spliced the guide openings are provided with guide pins. The openings 44 are weight-reducing apertures.

It has been mentioned above that a universal beam must be given low weight per length unit in order to facilitate handling. This means that the cross-sectional area of the profile is as small as possible while taking into consideration its performance otherwise. There is another reason for making this area small. The beam weight that can be extruded by today's machines is limited by the machine, primarily by its volume. If a thick beam with considerable length is desired, the cross-sectional area of the beam profile must be small. One way of achieving this is to remove some of the material from the U-shaped profile and its connecting member and to compensate weakness caused, by utilizing one or more thin, straight walls to stay like a truss construction the closed part of the beam defined by the upper part of the U-shaped profile and its connecting member. This prevents the right-angled profile of the beam becoming rhomboid under load when it is attached on one side. The thicker the beam, the more important is staying.

Figure 3:
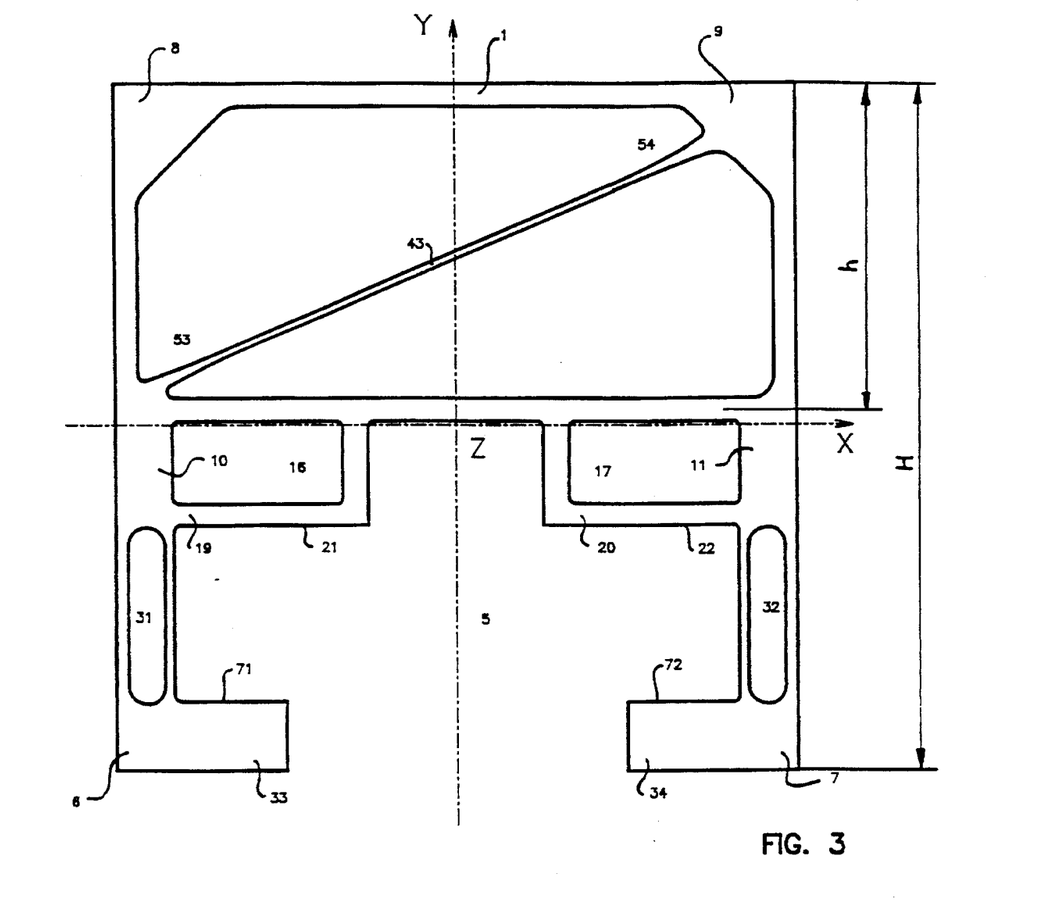
FIG. 3 shows a more complicated beam profile according to the invention.

Slim universal beams are suitably constructed without staying, FIG. 1. The same applies to beams attached only by two opposite sides, FIG. 2. The easiest form of staying is a simple, thin, diagonal wall 43, FIG. 3. This functions well for beams that are extruded in one piece. The two inclined walls 45, 46 in FIG. 7 provide good staying of a medium-sized universal beam. The truss construction can also be made more compact. One example is shown in FIG. 5 which illustrates a beam so thick or so long that, with current extrusion technology, it must be manufactured in two identical halves and then joined by means of welding at 47 and 48 in the axis of symmetry of the beam. In this example the truss construction consists of two pairs of thin walls 49, 51 and 50, 52, respectively, intersecting each other pairwise. Thin wall means in this case a wall that is considerably thinner than the outer walls of the universal beam above the reinforced portions. It should be noted that truss staying is really only necessary at the attachment points of the beam. Truss staying extending along the entire length of the beam may therefore be replaced by loose walls inserted only opposite to the attachment points for the beam (usually at the ends of the beam). In FIG. 3, for instance, instead of having an inclined wall 43, the section may be designed with guides (e.g. of the tongue or groove type). These guides are then placed close to the ends 53 and 54 of the wall 43 in the figure, the latter then being omitted. They are not shown in any particular figure. The device described can be utilized if it is important for the universal beam to be made somewhat lighter and longer than would otherwise be possible. Another way of achieving a longer universal beam is to extrude two identical beam halves which are then joined by means of two longitudinal welds at 47 and 48 as described above. Another method is to weld the beam out of three parts. Two of these are identical and are thus produced in one tool. They consist of the free shanks of the U-beam. The third part is the remainder of the universal beam in accordance with the invention. The weld seams, not illustrated in any of the drawings, are located a short distance below the drums, to prevent thermal stresses from deforming them. In this case the shanks are shaped, at least in the vicinity of the weld, as shown in FIG. 1, that is to say without recesses.

In order to make the section light and yet strong, the shape of certain walls in the section may also be modified. This applies to walls terminating at the beam attachments, both at the thickened portions 8 and 9 in the upper corners of the beam and also at the reinforced portions 10 and 11. One such wall is the truss wall 43 in FIG. 3. Other examples are the truss walls 45 and 46 in FIG. 7 and the upper drum walls 27 and 28 in the same figure. All these walls have been made thicker close to the attachment points of the beam than elsewhere, see for instance the ends 53, 54 of the wall 43. As a result of such a design the force flow from the attachments, which is intense and concentrated where it enters these walls, is gradually spread in the wall in the longitudinal direction of the beam as it passes further into the wall. The flow is thus intense where the wall is thick, and where it is spread and weak the wall is thin. The alternative, a wall of uniform thickness sufficient to withstand the concentrated force flow at the attachment points of the beam, is considerably heavier.

If a transmission belt or the like is used to accelerate and drive a load along the beam, it is advisable to allow the driving part of the belt 56 in FIG. 7, which is secured in a carriage, trolley or the like, to pass furthest down inside the shanks of the beam, while the return part 57 passes through a closed space 58 of the beam above its connecting member 4. If truss staying walls are arranged in this space it is important that they are positioned such that they do not impede the path of the return part 57. It has been found that if the transmission belt is to be able to drive and accelerate a load as large as the rest of the universal beam can handle, space must be reserved for a transmission belt having a width at least one third of the width of the beam. FIGS. 5 and 7 show examples of arrangements for this. In FIG. 5 the wall intersections 59 and 60 are far enough from each other to ensure the desired space for the return part of the transmission belt between them. Protrusions 61, 62, 63 and 64 provide sufficient guidance for the return part of the transmission belt. In FIG. 7 the upper side of the return part 57 is guided by a plastic strip 66 inserted in suitable guides 67, 68 on the truss walls 45 and 46. These guides are arranged sufficiently high up on these walls to allow space for a transmission belt of the desired width. The belt is supported and guided from below by protrusions 69, 70. The transmission belt 56, 57 may be of uniform thickness or profiled, smooth or toothed. It runs over a suitable driving wheel at one end of the beam and over a deflection wheel at its other end (not shown). The height of the space and guide means for the return part of the transmission can be adapted to the requirement. The position shown in FIG. 7 is intended for comparatively small drive and deflection wheels at the ends of the beam. Higher placing, suitable for larger drive and deflection wheels, is arranged for instance by replacing the plastic strip 66 with a suitable plastic profile higher up. This section can also be secured by the guides 67 and 68.

Below the transverse wall 18 and drums 16 and 17, and between the free portions of the shanks 2 and 3 described above, is a space 5 intended for means to support, guide and drive the load. These means may vary and may be selected from various load carriers such as trolleys, linear guides with balls and linear guides with steel rods and small profiled steel wheels. Carriages with wheels may also be used as load carriers. In order to accommodate all these alternatives six substantially flat attachment, guiding and support surfaces are arranged, two, 25 and 26, of which are formed by the sides of the drums facing each other, and two, 21, 22, are formed by the flat part of the lower sides of the drums. The remaining two guiding and support surfaces, 71, 72, are arranged on the upper side of the lower, inwardly extending, thickened corner portions 33, 34 of the beam.

Figure 6:
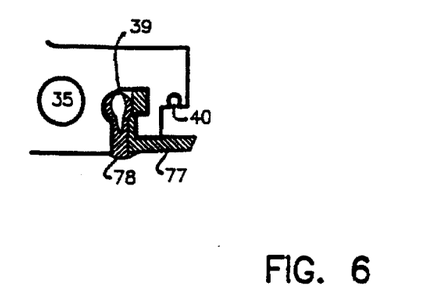
FIG. 6 shows an enlargement of the lower left-hand corner of the beam in FIG. 5, and an example of extra profiles for guiding and sealing against a transmission belt.
Figure 8:
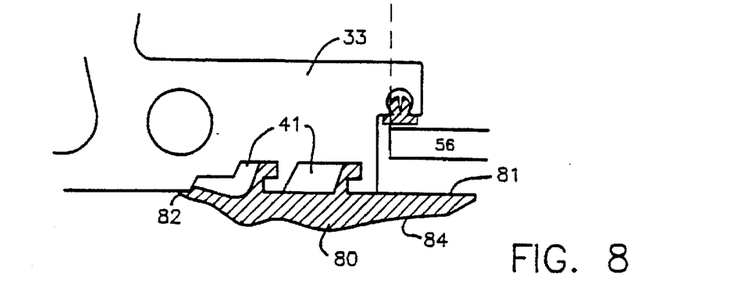
FIG. 8 shows an enlargement of the lower left-hand corner of the beam in FIG. 7, and an example of extra profiles for guiding and sealing against a transmission belt.

Linear guides can be applied in one or some of the rectangular spaces 73, 74, 75 in FIG. 7 and be secured to one of the flat surfaces 21, 22, 25, 26, 71, 72 or to the inner sides 77, 78 of the free portions 29, 30 of the shanks. Alternatively, carriages with an arbitrary number of large, noiseless wheels can be arranged in the space 5, one row of wheels being located in the space 73, one in the space 74 and one in the space 75. Each wheel is then arranged to roll directly against one of the six flat, firmly supported surfaces 21, 22, 25, 26, 71 and 72 mentioned above. Alternatively, a trolley carrying the load can be guided directly against these surfaces. Irrespective of the method of support and guidance along the beam, the load according to the above can be driven by the transmission belt 56 which is attached in the load carrier. The return part of the transmission belt then runs in the space 58. The driving part of the belt also functions to protect the space 5 from dust and other impurities. To satisfy this function, to support the transmission belt and to reduce friction between belt and beam, the beam may be provided with recesses 39, 40, 41 for attachment of support and slip strips. The enlarged view shown in FIG. 6 illustrates how the recess 36 in FIG. 5 can be used, where examples of a support strip 77 and a locking strip 78 have been inserted. Such strips may be extruded in plastic as accessories to the beam profile. The enlarged view shown in FIG. 8 shows how the recess 41 in FIG. 7 can be utilized. A combined support and locking strip 80 is so designed here as to provide satisfactory sealing against the belt at 81 and against the universal beam at 82. FIG. 7 also shows a slip strip 79 retained by the recess 40. The recesses 39, 40 and 41 may also retain other types of strips than those shown. If a narrower (and less expensive) transmission belt is chosen than the one, 56, shown in FIG. 7, the support flange 84 in FIG. 8 may be extended by the strip 80 and be adapted otherwise to the requirement.

As an alternative to belt transmission, the universal beam is also suitable for tractor drives known per se. This means that a wheel or track-type tractor is built into the load carrier. The tractor operates with toothed wheels or synchronous drive belt in engagement with a rack or equivalent structure attached along the beam. A suitable space 83 in FIG. 7 is reserved for said rack directly beneath the wall 18 above the surfaces 25 and 26. The rack, etc. may be glued or screwed to the wall 18 or be pressed into its correct position. To provide guidance, and in the latter case to retain the rack, a short upward extension 93, 94 of the flat surfaces 25 and 26 is provided opposite the rack, etc. The extension is curved, converging at the top, or otherwise shaped to enable retention of the rack.

In the case of belt transmission as above, the space 5 and its equipment is protected from dust and other impurities by the transmission belt 56 itself, guided for the purpose by strips, e.g. 77, 80.

In the case of tractor operation the space 5 is instead protected by a special sealing strip resting on the same strips 77, 80 or the like. The ends of the sealing strip are retained and it lies still except for the part where the tractor is. At this point it is moved from its resting position in an arc down below the movable tractor allowing it to pass even though it takes space not only in the space 5 but also some way below the universal beam.

Rectangular beams are normally attached at the corners. Other attachment points 12–15 in the reinforced portions 10, 11 have been mentioned above. These points and portions are of decisive significance to the stable securing of the beam. Aids for attachment may be of several types, such as threaded openings in the beams for screws, and T-shaped grooves opening in the surface of the profile which facilitate attachment with screws or bolts. According to the invention, aids of this type are suitably located in the locally reinforced portions 10, 11 of the profile at such a level that the force flow from the attachments passes straight into the upper and lower walls of the drum. The support bosses 95 and 96 pertaining to the attachment grooves 85 in FIG. 7 will especially contribute to transmitting the considerable force from the attachment screw or bolt, directly in towards the upper wall 27 and lower wall 19, respectively, of the drum. The equivalent applies with the groove 86 on the opposite side of the beam. In FIG. 1 the attachment points 12 and 13, which may alternatively be threaded screw holes, correspond to the support bosses 95 and 96.

A universal beam shaped as shown in FIG. 2 is attached according to the above in its reinforced portions 10, 11, more specifically at the attachment points 12, 13, 14 and 15. The beams in FIGS. 1, 3, 5 and 7 are so constructed that it is sufficient to attach them at either side. If attachment is selected on the left-hand side, for instance, the beam is secured in its thicker portion 8 at the upper left-hand corner, and in its reinforced portion 10 (FIGS. 1 and 3). Particularly when attachment grooves have been arranged in the beam, the grooves 85 and 87 are used initially, see FIGS. 5 and 7. Attachment at the lower corner, e.g. in groove 19, is of less importance but gives marginally increased stability in the longitudinal direction of the beam. All attachment points and grooves may be used for securing permanent arrangements to the beam such as cable troughs, cable racks, measuring transducers and safety devices.

Conventional, and even standard attachment grooves have the serious drawback that they do not permit attachments for large loads to be inserted in the grooves at arbitrary points along the beam. Only attachments for small loads, such as bolts with rectangular or rhomboid heads can be applied arbitrarily along the beam. These are designed to be inserted into the T-shaped groove from the side and then turned, up to a quarter of a turn. This results in negligible contact surface against the support surfaces of the groove, which explains why they can only be used for inconsiderable loads. They are therefore not suitable for attachment of or to a beam intended for considerable load as in the case of the invention. According to current technology, attachments for considerable load must be threaded into the channel from the ends of the beam, which must therefore be accessible.

In practice, however, the ends are not usually accessible once the beam has been erected.

Figure 9:
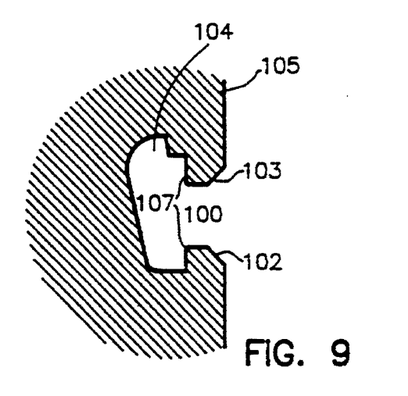
FIG. 9 shows an attachment groove for the beam according to the invention.
Figure 10:
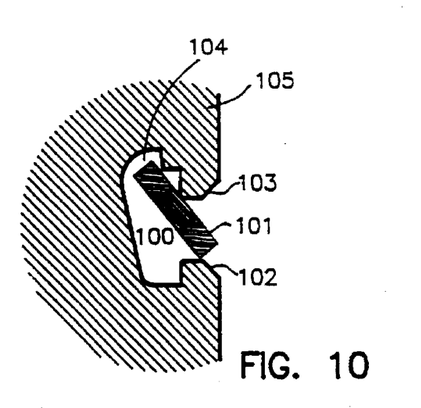
FIG. 10 shows how the attachment groove in FIG. 9 permits insertion of a threaded square washer or other nut.
Figure 11:
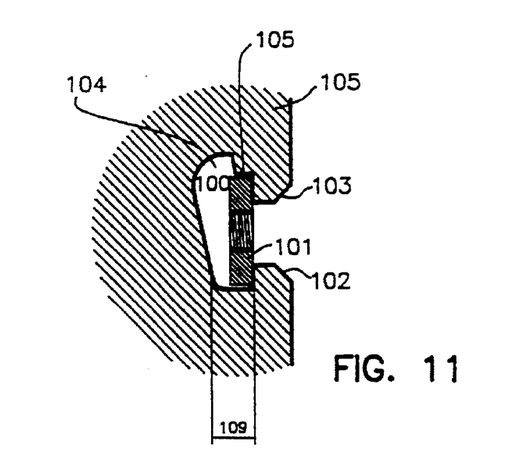
FIG. 11 shows the washer or nut in FIG. 7 in its operating position in a seat in the groove in FIG. 9.
Figure 12:
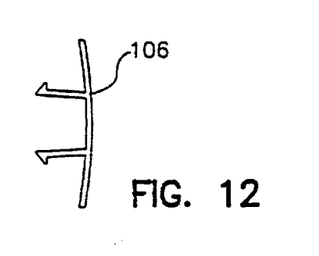
FIG. 12 shows an example of a protecting strip adapted for the attachment groove in FIG. 9.

The invention therefore also relates to a new form attachment groove, 100 in FIGS. 9–11. The shape of this groove permits nuts, square washers or flat steel pieces 101 with threaded holes, to be inserted from the side at any point along the beam. These attachment means have a considerably larger support area and thus much greater supporting capacity than the above-mentioned bolts with rectangular or rhomboid heads. The edges 102, 103 of the groove towards the outside of the profile are strongly bevelled to enable washers and other attachment means to be inserted obliquely into the groove without this having to be made deep. For the same purpose, the interior of the groove has a laterally vaulted space 104. This may be made double-sided, i.e. symmetrical in the groove. (Attachment grooves are usually symmetrical.) However, the groove is preferably made asymmetrical since the part 105 of the beam surrounding the groove can then be less bulky. The beam can thus be made both lighter and stronger while still retaining its bearing capacity. The bevel may also be provided on only one side of the groove, viz. 102. However, bevelling the groove symmetrically has two advantages. First of all it facilitates insertion of a protecting strip of plastic, for instance, e.g. 106 in FIG. 12, for use where the groove is not being used for attachment purposes. Secondly, the value of the material that can be removed by the bevel 103 is often negative since it would have increased the weight of the beam slightly without contributing correspondingly to its strength, torsional stiffness, etc. An example of a groove where the protecting strip 106 may also be used is the groove 107 uppermost in FIG. 5. The function of the strip here is to protect and hide the weld 47. The groove 107 is for insertion of said protecting strip. The bevel 102 and the vaulted space 104 are dimensioned so that (including manufacturing tolerances) they only just permit the insertion of square nuts or other flat attachment means 101 as shown in FIG. 10. If extra strength is required, flat steel pieces with one or more threaded apertures are used as attachment means 101. These provide unique strength and flexibility by efficiently distributing the clamping forces over a beam length selected as needed.

The width (including manufacturing tolerances) of the groove seat 107 is only just sufficient to receive the attachment means 101. The depth 108 of the seat is preferably less than the thickness of the attachment means 101. This achieve further saving in material. The smallest depth 109 of the vaulted space opposite the threaded aperture in the nut, etc. 101, on the other hand, is larger than necessary for the nut, etc. 101 to be just inserted. This allows space for the bolt which is to be screwed into the nut, etc. 101, while at the same time saving space in an area with negligible strain and where the material therefore provides no benefit. To save weight in the beam certain grooves, e.g. 87–90, may be given deeper vaulting than others, e.g. 85, 86, 91 and 92. However, the grooves have the same appearance from the outside. So that they will all be perceived to have the same depth—which is important for the installer—the deeper grooves are provided with a small central spine 99 in FIG. 5, so that the maximum length of bolts that can be inserted will be the same for all grooves in the profile.

Since the universal beam according to the invention is unique and is extruded in tools unique to this beam, the invention also includes a tool for manufacturing the beam, the extrusion gap in this tool having substantially the same shape as the extruded profile. This applies regardless of whether the beam is extruded in one piece or whether, in accordance with FIG. 5, it is joined together along its axis of symmetry from two identically extruded halves or if it is joined from three parts, two of which are identical, i.e. from the free portions 29, 30 of the shanks of the beam profile.

We claim:

1. A universal beam for supporting a movable load, comprising:

a substantially symmetrical substantially inverted U-shaped profile extrusion having a top, first and second substantially parallel shanks extending downwardly from said top, a bottom, and a connecting member extending between and connected to said shanks and defining on a first side thereof, between said connecting member and said bottom, a load supporting, guiding, and driving volume;

said extrusion having a height and a width, said width being approximately equal to said height;

said shanks, between said connecting member and said top, having a thickness, except at a corner, between said top and said connecting member, that is at most 5% of said extrusion width; and said shanks having locally reinforced portions, said connecting member extending between locally reinforced portions of said shanks, and comprising a central wall substantially transverse to said shanks, and first and second drums adjacent said locally reinforced portions, said drums having inner and outer walls, and top and bottom portions; said locally reinforced portions forming said outer walls of said drums; said central wall forming said top portion of said drums; each said bottom portion connected to a said outer wall and a said inner wall, and each said inner wall connected to said central wall and said bottom portion; said bottom portion being generally transverse to said shanks and having a generally flat bottom; and said inner walls being substantially parallel to said shanks and having a sustantially flat surface.

2. A beam as recited in claim 1 further comprising first and second corners formed between said top and said shanks, said shanks and top having thickened portions at said corners.

3. A beam as recited in claim 1 wherein said top and said shanks, on a second side of said central wall opposite said first side, have a substantially continuous curved cornerless configuration.

4. A beam as recited in claim 1 wherein said bottom includes thickened corner portions that are spaced from each other in a dimension parallel to said central wall.

5. A beam as recited in claim 4 wherein said shanks have portions above and below said reinforced portions, and wherein the shank portions below said locally reinforced portions have greater flexural stiffness than the portions above said locally reinforced portions, except at said thickened corner portions.

6. A beam as recited in claim 4 wherein said load supporting, guiding and driving volume comprises six substantially flat guiding and supporting surfaces for a movable load, two of said supporting surfaces comprising said inner walls, two of said supporting surfaces comprising said drum bottom portions, and the other two of said supporting surfaces comprising upper surfaces of said bottom thickened corner portions.

7. A beam as recited in claim 6 wherein said bottom thickened corner portions include recesses for guiding and sealing a transmission belt for driving a movable load within said load supporting, guiding and driving volume.

8. A beam as recited in claim 4 wherein said bottom thickened corner portions include recesses for guiding and sealing a transmission belt for driving a movable load within said load supporting, guiding and driving volume.

9. A beam as recited in claim 1 wherein said shanks, between said connecting member and said top, have a thickness, except at a corner, between said top and said connecting member, that is at most 4% of said extrusion width.

10. A beam as recited in claim 1 wherein the length of said central wall between said inner walls is greater than the length of each of said inner walls.

11. A beam as recited in claim 1 wherein said central wall is substantially linear between said shanks.

12. A beam as recited in claim 1 wherein said drums and central wall are positioned and dimensioned such that the section factor of torsional stiffness of said beam is at least 30% of the smallest of the two moments of inertia of the profile of said beam about its main axes of inertia.

13. A beam as recited in claim 1 wherein said shanks have portions above and below said reinforced portions, and wherein the shank portions below said reinforced portions have greater flexural stiffness than the portions above said reinforced portions.

14. A beam as recited in claim 1 wherein said connecting member and said top define an open volume therebetween, and further comprising at least one thin straight wall trusses disposed in said open volume.

15. A beam as recited in claim 14 wherein said at least one thin straight truss has thickened portions where it integrally joins said beam at the ends thereof.

16. A beam as recited in claim 14 wherein a plurality of said thin straight wall trusses are provided, and wherein said trusses define a centrally situated open volume which has a width that is at least one-third the width of said extrusion.

17. A beam as recited in claim 1 further comprising a friction plate or rack disposed in said load supporting, guiding and driving volume engaging said inner walls and the bottom surface of said central wall between said inner walls.

18. A beam as retired in claim 1 further comprising T-shaped grooves formed in said locally reinforced portions of said shanks and facing outwardly, said grooves including supporting bosses therein.

19. A beam as recited in claim 18 wherein said T-shaped grooves are formed with a pronounced bevel and are dimensioned for receiving threaded square washers, nuts, or like flat pieces of steel with threaded openings therein, inserted into operative association with said T-shaped grooves through a leg portion of the T shape thereof.

20. A beam as recited in claim 1 wherein said extrusion is of aluminum.

* * * * *